(12) United States Patent
Souto Serantes et al.

(10) Patent No.: US 7,651,726 B2
(45) Date of Patent: Jan. 26, 2010

(54) PROCESS FOR OBTAINING SILICON NITRIDE ($SI_3N_4$) SURFACE COATINGS ON CERAMIC COMPONENTS AND PIECES

(75) Inventors: Alejandro Souto Serantes, Santiago de Compostela (ES); Francisco Guitián Rivera, Santiago de Compostela (ES); Javier Bullón Camarasa, Santiago de Compostela (ES)

(73) Assignee: Universidade de Santiago de Compostela, Santiago de Compostela (ES)

( * ) Notice: Subject to any disclaimer, the term of this patent is extended or adjusted under 35 U.S.C. 154(b) by 290 days.

(21) Appl. No.: 10/545,985

(22) PCT Filed: Feb. 18, 2004

(86) PCT No.: PCT/ES2004/000071
§ 371 (c)(1),
(2), (4) Date: Jul. 20, 2006

(87) PCT Pub. No.: WO2004/074212
PCT Pub. Date: Sep. 2, 2004

(65) Prior Publication Data
US 2006/0251816 A1    Nov. 9, 2006

(30) Foreign Application Priority Data
Feb. 21, 2003 (ES) .................................. 200300434

(51) Int. Cl.
*B05D 3/00* (2006.01)
(52) U.S. Cl. ................... 427/189; 427/199; 427/202; 427/204; 427/255.18; 427/255.27; 427/255.393; 427/376.1

(58) Field of Classification Search ............ 427/255.18, 427/255.27, 255.393, 376.1, 189, 199, 202, 427/204
See application file for complete search history.

(56) References Cited

U.S. PATENT DOCUMENTS

| | | | |
|---|---|---|---|
| 4,755,220 A | 7/1988 | Woditsch et al. | |
| 4,943,401 A * | 7/1990 | Edler et al. | 264/647 |
| 5,252,248 A | 10/1993 | Edler et al. | |
| 6,165,425 A | 12/2000 | Lange et al. | |
| 6,582,779 B2 * | 6/2003 | Li et al. | 427/585 |
| 2002/0166503 A1 * | 11/2002 | Magras et al. | 117/100 |

OTHER PUBLICATIONS

Zhong-Zhou, Yi et al. "Study on gelcasting of silicon nitride-bonded silicon carbide refractories," Material Letters, Nov. 2002, vol. 56, pp. 895-900.
Dietl. "Metallurgical ways of Silicon Meltstock Processing." *Silicon Processing for Photovoltaics II*. 1987. pp. 285-352.
Moulson. "Review: Reaction -bonded silicon nitride: its formation and propertites." *Journal of Materials Science*. vol. 14. 1979. pp. 1017-1051.

* cited by examiner

*Primary Examiner*—Binh X Tran
(74) *Attorney, Agent, or Firm*—Merchant & Gould P.C.

(57) ABSTRACT

A process of obtaining silicon nitride ($Si_3N_4$) surface coatings on ceramic pieces and components by impregnation of the surfaces of the ceramic pieces with silicon powder suspensions with a particle size preferably less than 200 μm. The thickness of the coatings depends on the impregnation time and on the properties of the slip and the ceramic piece. The subsequent nitridation of the coating by thermal treatment at temperatures between 1300° C. and 1500° C. in $N_2$ atmospheres leads to a continuous $Si_3N_4$ coating. The chemical stability and compatibility between $Si_3N_4$ and molten silicon enables its application in silicon metallurgy, in manufacturing crucibles for silicon fusion or for housing said molten silicon, in manufacturing pipes and chutes for its transport or in manufacturing different components for its subsequent purification.

13 Claims, 3 Drawing Sheets

PROCESS FOR OBTAINING SILICON NITRIDE ($Si_3N_4$) SURFACE COATINGS ON CERAMIC COMPONENTS AND PIECES

The process is applicable in processing and producing molten silicon. Thermal stability, chemical compatibility with molten silicon and the low cost of the composite materials obtained make them ideal candidates in molten silicon housing and transport processes, as well as for silicon fusion and purification.

Most silicon currently existing on the market is obtained by carbothermal reduction of silica ($SiO_2$). This process is carried out in electric arc furnaces at temperatures in the order of 2000° C. and leads to a product with a 98.5%-99% purity, known as metallurgical-grade silicon. Silicon thus manufactured leaves the furnace in liquid form at a temperature of about 1600° C. and is collected with the aid of pipes or chutes over crucibles, where it finally solidifies. All the components used in handling silicon are ceramic components and they must be periodically replaced given the high temperature of molten silicon and its high reactivity.

One of the more interesting potential applications of metallurgical-grade silicon is the manufacture of solar cells for producing electrical power. Currently, most solar cells are built from a silicon wafer or portion with high purity (~99.999%). This purity is much higher than that of metallurgical-grade silicon, therefore the cells must be manufactured with the excess silicon from the semi-conductor industry. This silicon, known as electronic-grade silicon, is obtained by the method of thermal decomposition of silane, and it has a higher purity than that which is strictly necessary for correct operation of the cells (>99.99999%), in addition to a high cost.

This situation of dependence on the photovoltaic industry has caused an intense investigation in search of metallurgical-grade silicon purification processes that produce silicon with a suitable purity for its use in solar cells at a competitive economic cost. Different effective routes of purification have been designed and confirmed at laboratory and pilot plant scale, although not yet economically cost-effective at an industrial level. Treatments with molten slag, directional solidification or reactive gas etching can be cited among these methods (Dietl, J., "Metallurgical Ways of Silicon Meltstock Processing" in Silicon Processing for Photovoltaics II, Edited by C. P. Khattak and K. V. Ravi. Elsevier Science, 1987, pp. 285-352).

Most known purification processes require melting the silicon in one of their intermediate steps. This makes is indispensable to have different components (crucibles, pipes, chutes, pipettes, etc.) that are stable at the high working temperatures, compatible with the molten silicon and non-contaminating. There are few materials capable of meeting these requirements and which can therefore be used in manufacturing said components. Among them, the most used materials are silica ($SiO_2$) and silicon nitride ($Si_3N_4$). These pieces are very expensive and their price increases exponentially with size. On the other hand, their useful life under normal working conditions is very reduced, negatively affecting the final cost of the purified silicon.

The present invention describes an alternative process for manufacturing low-cost ceramic materials for their use in silicon metallurgy. These pieces are actually ceramic composites and are made up of two portions with different properties and functions: a structural portion and a $Si_3N_4$ surface coating. The structural portion can be manufactured with any ceramic material stable at the high temperatures of molten silicon, and it has the necessary shape, size and physical properties for each case. The surface coating is stable, inert and does not contaminate molten silicon, and it protects the ceramic and prevents its reaction with the silicon.

DETAILED DESCRIPTION

Figure 1:
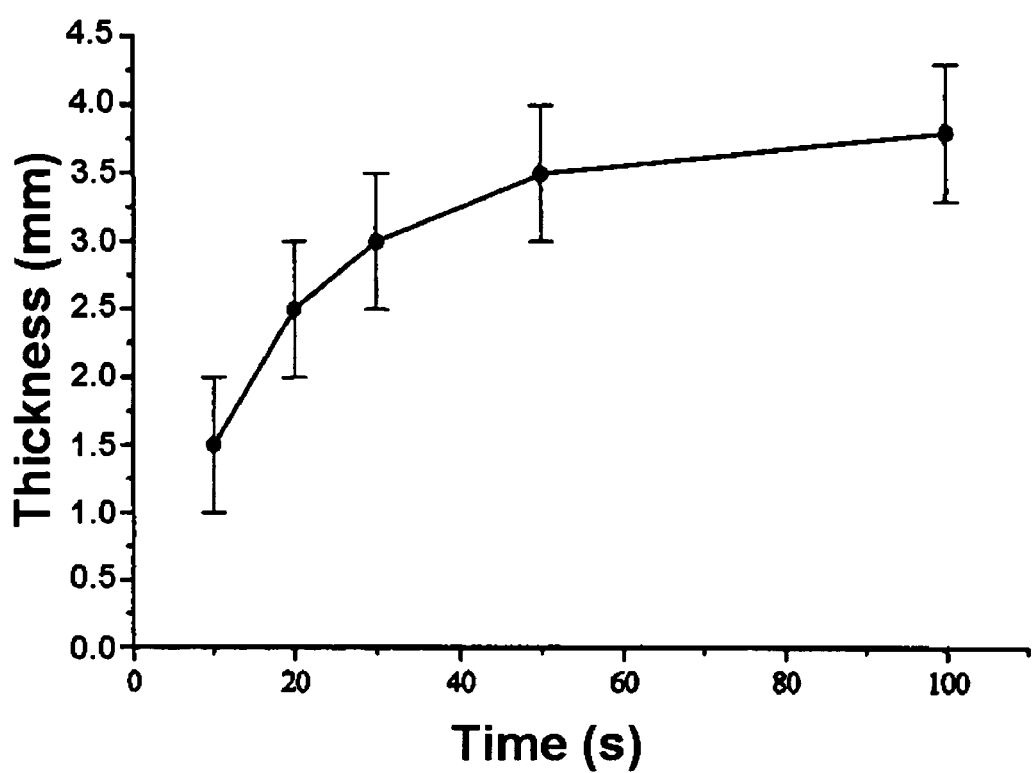
FIG. 1 shows the evolution of the thickness of the surface layer of silicon formed by immersion of a crucible of refractory concrete in a silicon slip according to time.

The proposed process allows obtaining ceramic components and pieces stable at high temperatures and suitable for fusion, transport and purification of molten silicon at cost-effective prices due to the low cost of the raw materials and the different manufacturing steps, and with the further advantage of being very flexible and adjustable to different shapes and sizes.

The process consists of impregnating the previously formed and sintered ceramic components and pieces with aqueous silicon solutions ("slips"). Silicon coatings on the surfaces of the ceramic piece which have been in contact with the slip are obtained as result of this process. The subsequent thermal treatment of the piece in $N_2$ atmospheres converts the Si into a continuous $Si_3N_4$ surface coating that is stable and impermeable to molten silicon.

The initial ceramic pieces can be manufactured from any material capable of withstanding the high temperatures of molten silicon (generally comprised between 1500° C. and 1700° C.), by means of any of the different ceramic processing techniques (casting, injection, hydraulic setting of concretes, turning and machining, gelcasting, etc.). The choice of the suitable technique is a function of parameters such as the shape and size of the component, or the required mechanical properties. Ceramic pieces with different compositions have been studied for manufacturing these components, good results being obtained with very different materials such as graphite, high-temperature refractory concretes, aluminosilicate ceramics, alumina, zirconia and zirconates. With the exception of graphite, which is turned from already consolidated solid blocks, the manufacture of these pieces ends with their thermal treatment at temperatures generally less than 1500° C., in which they acquire the physical properties necessary for their subsequent impregnation and use.

The silicon slips are prepared by adding powdered silicon to the suitable amount of water under strong mechanical stirring conditions. Silicon powders having different features have been tested, and it has been verified that it is preferable to use silicon with particle sizes less than 200 μm. The best results are reached with particles of less than 75 μm. When it falls on the water, the silicon powder forms aggregates made up of a large amount of particles which are impossible to eliminate only by mechanical stirring. This behavior makes it necessary to add small amounts of deflocculating agents (<0.1% by weight) which break up these aggregates and allow perfectly homogenizing the suspension. Out of the various deflocculating agents tested, the best results have been obtained with organic ionic polymers. The use of these compounds allows adding large amounts of silicon powder to water while the mixture maintains good flow conditions, which are indispensable for its subsequent use. The best slips with silicon of less than 75 µm reach 72% solid contents by weight and viscosities in the order of 1500 Cp, with Dolapix PC-67 (Zschimmer & Schwarz, Chemische Fabriken) as a deflocculating agent. It is occasionally necessary to improve bonding of the paste to the original ceramic piece, especially when it is going to be used on graphite components. The solution consists of adding small amounts of gelling or plasticizer agents to the silicon slip. Different compounds have been tested for this purpose (cellulose, agar, carrageenan, alginate, and polyethylene glycol polymers, etc.), and the best results are obtained with small amounts of methylcellulose (<1% by weight).

The surfaces of the original ceramic pieces are impregnated with the silicon slip by means of processes such as immersion, pressure casting, gelcasting, etc. Under these conditions the silicon bonds to said surfaces forming a coating the thickness of which depends on the properties of the ceramic piece (porosity and pore size, specific surface, performance against water, etc.), on the features of the slip (solids content, viscosity, adhesive or cohesive character, plasticity, etc.), and on impregnation time.

FIG. 1 shows the evolution of the thickness of the surface layer of silicon formed by immersion of a crucible of refractory concrete in a silicon slip according to time. Once the impregnation has concluded, the excess slip is removed and it is allowed to air-dry. The final drying is carried out in an oven at 100° C. for 1 hour.

The last manufacturing step consists of converting the silicon of the coating into $Si_3N_4$. This process is carried out by means of a process known as silicon nitridation by reactive sintering, which is based on the reaction between silicon and $N_2$ at high temperatures (Moulson, A. J., "Review. Reaction-bonded Silicon Nitride: its Formation and Properties" J. Mat. Sci, 14, 1017-1051, 1979), and leads to $Si_3N_4$ ceramic pieces with pore sizes generally less than 50 µm, which are completely impermeable to molten silicon. The equation for the reaction is as follows:

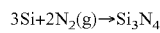

$$3Si + 2N_2(g) \rightarrow Si_3N_4$$

This reaction takes place at temperatures of about 1400° C. and does not alter the original dimensions of the silicon coating.

Different experimental conditions have been studied for nitridation optimization, from treatments in $N_2$ atmospheres having different features (static $N_2$ at 1 atm of pressure, constant gas flow with different flow rates, gas overpressure) to calcinations at various temperatures, in a single step or in successive ramps at different temperatures in each one of them. The best silicon conversion temperatures are reached in treatments in the order of 12 hours made up of two steps of 6 hours each, the first one at 1350° C. and the second one at 1425° C. Under these conditions said percentage exceeds 90%.

As a final result ceramic composites are obtained that are suitable for silicon metallurgy and for the subsequent treatment thereof. These pieces are made up of a ceramic matrix resistant to high temperatures and a continuous $Si_3N_4$ surface coating that is stable and impermeable to molten silicon, and having controlled thickness. A further advantage of the $Si_3N_4$ coating on the graphite components is that its presence prevents direct contact of said graphite with $O_2$ in the atmosphere, thus preventing its immediate oxidation and degradation at high temperatures in the air. As a result the thus protected graphite components can also be used in air or other oxidizing environments, which notably broadens the field of application of this material.

EXAMPLE 1

Figure 2:
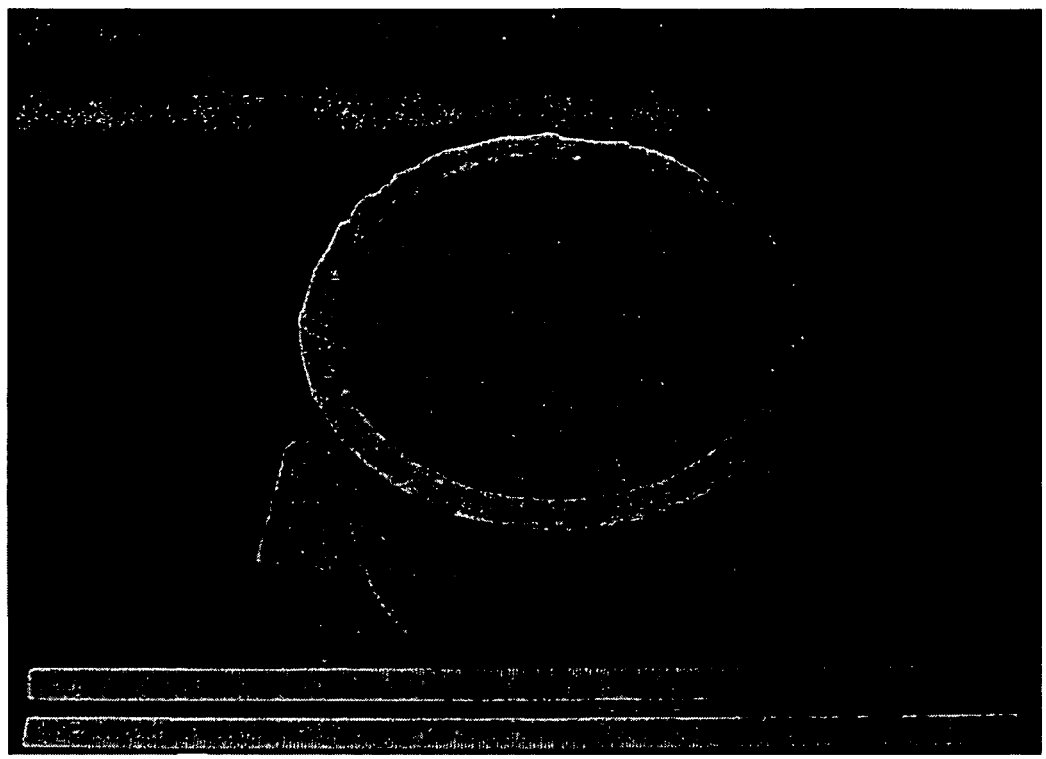
FIG. 2 illustrates a cylindrical crucible.

A cylindrical crucible is made with high temperature refractory concrete by hydraulic setting and is calcined for 2 hours at 1350° C. The final crucible dimensions are 12 cm in height, 12 cm internal diameter, 1 cm of wall thickness (FIG. 2).

An aqueous slip is prepared with silicon powder having a particle size of less than 75 µm. To that end silicon is added to a suitable amount of water in order to reach a solids content of 72% by weight, and it is stirred with the aid of a mechanical blade stirrer until achieving complete homogenization. Dolapix PC-67 is used as a deflocculating agent. The total time required for preparing the slip is about 3 hours.

Then the crucible is filled with the silicon slip. The impregnation of the crucible walls, with the subsequent formation of the silicon surface coating, is very fast and contact times of 20 seconds are enough to reach wall thicknesses between 2 and 3 mm. Once this time has lapsed the excess slip is poured off, the mold is allowed to be drained and it is allowed to slowly air-dry. The final drying is carried out in an oven at 100° C. for 1 hour. The excess slip of this process is recovered and can be used as is for subsequent impregnations of other pieces.

Figure 3:
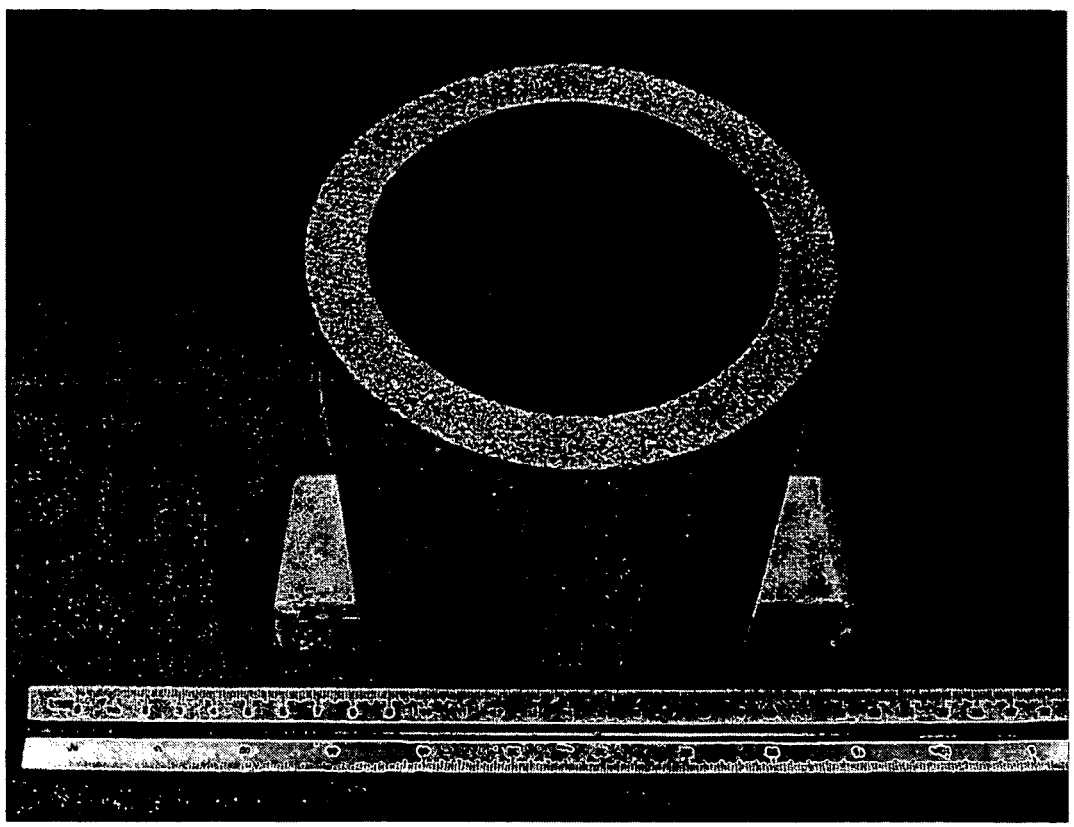
FIG. 3 illustrates the crucible with a $Si_3N_4$ coating.

The piece thus prepared is introduced in a controlled atmosphere furnace and is nitrided under a constant $N_2$ flow of 0.2 L/min. The calcination cycle consists of a first 6-hour ramp at 1350° C. and a second 6-hour ramp at 1425° C. The temperature increase and reduction rate is 10° C./minute. The nitridation percentage reached is 92%. FIG. 3 shows the crucible with the $Si_3N_4$ coating.

EXAMPLE 2

Figure 4:
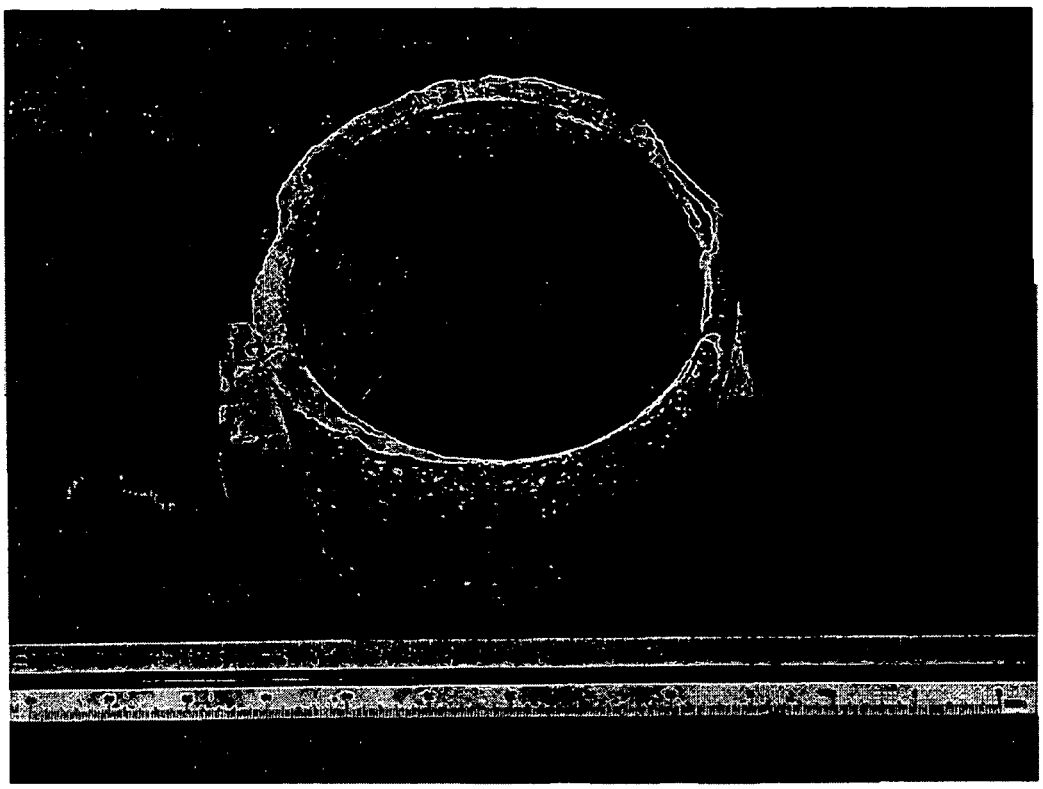
FIG. 4 illustrates a cylindrical graphite crucible manufactured by turning and machining a solid graphite block.

A cylindrical graphite crucible having dimensions of 14 cm in height, 12 cm internal diameter and 1.5 cm of wall thickness is manufactured by turning and machining starting from a solid graphite block (FIG. 4).

A 72% by weight aqueous slip is prepared with silicon powder having a particle size less than 75 µm. The preparation process is identical to that described in Example 1. In order to improve slip to graphite bonding, small amounts of methylcellulose (0.4% by weight) are added and it is stirred for about 2 hours until achieving complete homogenization. The result is a slightly more viscous solution than the original one which readily bonds to the graphite.

Figure 5:
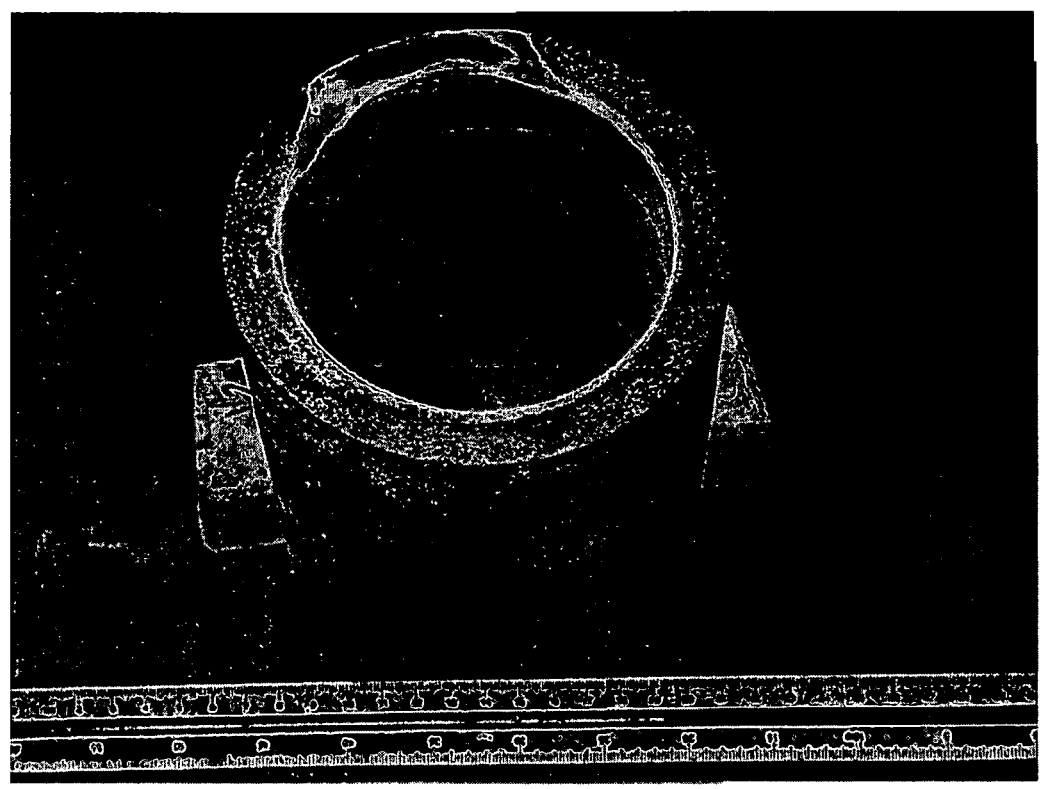
FIG. 5 shows the finished cylindrical crucible.

The graphite crucible is filled with this suspension, is impregnated during 20 seconds and the excess slip is removed. The crucible is allowed to air-dry with the coating. The final drying is carried out in an oven at 100° C. for 1 hour. As in Example 1, the excess slip of this impregnation step can be subsequently reused with other pieces. Thermal nitridation treatment consists of a first 6-hour ramp at 1350° C. and a second 6-hour ramp at 1425° C. under a constant $N_2$ flow of 0.2 L/minute. The temperature increase and reduction rate is 10° C./minute. The nitridation percentage reached is 90%. FIG. 5 shows the finished crucible.

The invention claimed is:

1. A process of obtaining silicon nitride ($Si_3N_4$) surface coatings on ceramic pieces and components for silicon fusion and molten silicon treatment, wherein a ceramic composite is manufactured from a structural, thermally stable ceramic material and a $Si_3N_4$ surface coating, comprising:
   a) placing a silicon coating from an aqueous silicon solution on the surface of the ceramic material;
   b) treating thermally the ceramic material and the silicon coating from step a) in $N_2$ atmospheres.

2. A process according to claim 1, wherein the ceramic pieces and components are selected from the group consisting of crucibles, pipes, pipettes, and chutes.

3. A process according to claim 1, wherein the ceramic material is manufactured by processing techniques selected from the group consisting of casting, injection, hydraulic setting, and machining.

4. A process according to claim 1, wherein the process of placing the silicon coating is selected from the group consisting of impregnation, gelcasting, pressure casting, spraying and immersion.

5. A process according to claim 1, wherein the process is used for housing, transporting and purifying molten silicon.

6. A process according to claim 1, wherein the ceramic material is stable at temperatures up to 1700° C. and compatible with $Si_3N_4$.

7. A process according to claim 6, wherein the ceramic material is selected from the group consisting of refractory concretes, aluminosilicate ceramics, alumina, graphite, zirconias and zirconates.

8. A process according to claim 1, wherein the structural ceramic material is thermally treated in a furnace with a controlled $N_2$ atmosphere; wherein the treatment is carried out at a temperature between about 1300° C. and 1500° C. for up to 12 hours and wherein the $N_2$ atmosphere may be static, under constant gas flow, or under gas overpressure.

9. A process according to claim 8, wherein the thennal treatment is run in two steps, comprising:
  b1) thermal treatment up to 6 hours at 1350° C.; and
  b2) thermal treatment up to 6 hours at 1425° C.

10. A process according to claim 1, wherein the aqueous silicon solution is prepared by stirring of a silicon powder with a particle less than 200 μm into water, wherein homogenization of the aqueous silicon solution is achieved by adding small amounts of deflocculating agents to the solution; and wherein the adhesive performance of the solution is improved by adding plasticizer and/or gelling agents.

11. A process according to claim 10, wherein the deflocculating agents are ionic organic chains.

12. A process according to claim 10, wherein the total weight percent of the plasticizer and/or gelling agents is less than about 1% by weight of the total weight percent of the silicon solution.

13. A process according to claim 10, wherein the plasticizer and/or gelling agents are selected from the group consisting of cellulose, alginate, agar, and carrageenan polymers.

* * * * *